US012335997B2

(12) United States Patent
Wang et al.

(10) Patent No.: US 12,335,997 B2
(45) Date of Patent: Jun. 17, 2025

(54) JOINT-PROCESSING OF RANDOM ACCESS CHANNEL COMMUNICATIONS

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 562 days.

(21) Appl. No.: 17/759,037

(22) PCT Filed: Dec. 30, 2020

(86) PCT No.: PCT/US2020/067473
§ 371 (c)(1),
(2) Date: Jul. 18, 2022

(87) PCT Pub. No.: WO2021/154443
PCT Pub. Date: Aug. 5, 2021

(65) Prior Publication Data
US 2023/0041847 A1 Feb. 9, 2023

Related U.S. Application Data

(60) Provisional application No. 62/967,164, filed on Jan. 29, 2020.

(51) Int. Cl.
H04W 74/08 (2024.01)
H04W 74/00 (2009.01)
(Continued)

(52) U.S. Cl.
CPC ..... *H04W 74/006* (2013.01); *H04W 74/0833* (2013.01); *H04W 76/15* (2018.02)

(58) Field of Classification Search
CPC ............. H04W 74/006; H04W 74/004; H04W 74/002; H04W 74/0836; H04W 74/0833;
(Continued)

(56) References Cited

U.S. PATENT DOCUMENTS

2013/0083695 A1 4/2013 Narasimha et al.
2014/0204898 A1 7/2014 Yang et al.
(Continued)

FOREIGN PATENT DOCUMENTS

CN 102548016 7/2012
CN 111183684 A * 5/2020 ........... H04L 5/0048
(Continued)

OTHER PUBLICATIONS

"International Preliminary Report on Patentability", Application No. PCT/US2020/067473, Jul. 28, 2022, 14 pages.
(Continued)

*Primary Examiner* — Phong La
(74) *Attorney, Agent, or Firm* — Colby Nipper PLLC

(57) ABSTRACT

Techniques and apparatuses are described for joint-processing of random access channel communications to improve the reliability and/or the geographic range of a random access procedure for a user equipment. Joint-processing, including joint-transmission and/or joint-reception, by a user equipment-coordination set on behalf of a single user equipment, or by an Active Coordination Set of base stations with the single user equipment, can improve the link budget of Random Access Channel communications and facilitate network access for a user equipment at a greater distance from a base station or in the face of challenging channel conditions.

20 Claims, 8 Drawing Sheets

(51) Int. Cl.
*H04W 74/0833* (2024.01)
*H04W 76/15* (2018.01)

(58) Field of Classification Search
CPC . H04W 74/0838; H04W 74/04; H04W 76/15; H04W 76/11; H04W 76/10
See application file for complete search history.

(56) References Cited

U.S. PATENT DOCUMENTS

| | | | |
|---|---|---|---|
| 2014/0334402 A1 | 11/2014 | Chen et al. | |
| 2014/0376486 A1 | 12/2014 | Lee et al. | |
| 2015/0011230 A1 | 1/2015 | Noh et al. | |
| 2016/0183225 A1* | 6/2016 | Ahn | H04W 72/23 370/329 |
| 2016/0192420 A1 | 6/2016 | Kim et al. | |
| 2018/0092129 A1 | 3/2018 | Guo | |
| 2018/0103492 A1 | 4/2018 | Akkarakaran et al. | |
| 2018/0324853 A1 | 11/2018 | Jeon et al. | |
| 2019/0215220 A1 | 7/2019 | Islam et al. | |
| 2020/0015266 A1* | 1/2020 | Yan | H04W 74/0833 |
| 2020/0092685 A1* | 3/2020 | Fehrenbach | H04W 36/08 |
| 2020/0314917 A1* | 10/2020 | Jeon | H04W 74/08 |
| 2021/0014893 A1* | 1/2021 | Park | H04L 5/0092 |
| 2021/0105808 A1* | 4/2021 | Lei | H04L 5/0051 |

FOREIGN PATENT DOCUMENTS

| | | | | |
|---|---|---|---|---|
| EP | 2387268 | | 11/2011 | |
| EP | 3911100 A1 * | | 11/2021 | H04W 74/006 |
| WO | 2016171731 | | 10/2016 | |
| WO | WO-2016171731 A1 * | | 10/2016 | H04W 72/1278 |
| WO | 2018106161 | | 6/2018 | |
| WO | WO-2019061021 A1 * | | 4/2019 | H04L 1/0003 |
| WO | 2020186097 | | 9/2020 | |
| WO | 2021154443 | | 8/2021 | |

OTHER PUBLICATIONS

"Foreign Office Action", IL Application No. 294816, Sep. 22, 2024, 3 pages.
"Foreign Office Action", CN Application No. 202080093805.9, Oct. 31, 2024, 10 pages.
"Foreign Office Action", IN Application No. 202247043614, Nov. 3, 2022, 5 pages.
"Foreign Office Action", EP Application No. 20845543.6, Mar. 19, 2024, 6 pages.
"International Search Report and Written Opinion", Application No. PCT/US2020/067473, Jun. 11, 2021, 20 pages.
"Invitation to Pay Additional Fees", PCT Application No. PCT/US2020/067473, Apr. 13, 2021, 13 pages.
"On the Need for RACH Enhancement for UL CoMP", 3GPP TSG RAN WG1 Meeting #66bis, R1-113331 Zhuhai, China, Oct. 10-14, 2011, Oct. 2011, 2 pages.
"Timing-Advance Issue in Uplink CoMP", 3GPP TSG RAN WG1 Meeting #57, R1-091718, San Francisco, USA, May 4-8, 2009, May 2009, 4 pages.
"Written Opinion", Application No. PCT/US2020/067473, Dec. 14, 2021, 11 pages.
Saily, et al., "5G Asynchronous Control Functions and Overall Control Plane Design", Accessed online at: https://metis-ii.5g-ppp.eu/wp-content/uploads/deliverables/METIS-II_D6.2_V1.0.pdf on Jan. 23, 2018, Apr. 30, 2017, 167 pages.

* cited by examiner

JOINT-PROCESSING OF RANDOM ACCESS CHANNEL COMMUNICATIONS

RELATED APPLICATION(S)

This application is a national stage entry of International Application No. PCT/US2020/067473, filed Dec. 30, 2020, which claims the benefit of U.S. Provisional Application No. 62/967,164, filed Jan. 29, 2020, the disclosures which are incorporated herein by reference in their entirety.

BACKGROUND

Generally, a base station manages a wireless connection with a user equipment (UE) that is connected to a wireless network. The base station determines configurations for the wireless connection, such as bandwidth, timing, and protocol for the wireless connection.

The quality of service between the UE and the base station can be degraded by a number of factors, such as low signal strength, bandwidth limitations, interfering signals, operation in higher (above-6 GHZ) frequency bands, and so forth. This is particularly true for UEs operating at a cell edge that is frequently troubled by weak signal quality that impedes network access. Existing techniques for network access do not consider the joint-processing (joint-transmission, joint-reception) capabilities of a user equipment-coordination set (UECS) or a base station coordination set (sometimes called an Active Coordination Set (ACS)) to improve the performance of Random Access Channel (RACH) communications for network access.

SUMMARY

This summary is provided to introduce simplified concepts of joint-processing of random access channel communications. The simplified concepts are further described below in the Detailed Description. This summary is not intended to identify essential features of the claimed subject matter nor is it intended for use in determining the scope of the claimed subject matter.

In aspects, methods, devices, systems, and means for accessing a wireless communications network using a random access procedure by a user equipment in a user equipment-coordination set (UECS) are described. A first user equipment, configured as a coordinating user equipment for the UECS, receives a Random Access Channel (RACH) resource group configuration from a base station for random access procedure communications. The coordinating user equipment receives a request to initiate the random access procedure from a second user equipment in the UECS and generates a Random Access Preamble message using a preamble sequence included in the RACH resource group configuration. The coordinating user equipment communicates the Random Access Preamble message to multiple user equipments in the UECS that directs the multiple user equipments to transmit the Random Access Preamble message using a first set of time-frequency resources indicated in the RACH resource group configuration, and the coordinating user equipment transmits the Random Access Preamble message to the base station using the time-frequency resources.

In further aspects, methods, devices, systems, and means for providing access to a wireless communications network using a random access procedure by a base station in an active coordination set (ACS) are described. The base station coordinates with other base stations in the ACS to allocate a random access resource set for a user equipment to perform the random access procedure with the ACS and transmits configuration information for the random access resource set to the user equipment. The base station receives a Random Access Preamble from the user equipment, receives samples of the Random Access Preamble from one or more other base stations in the ACS, and jointly processes the received Random Access Preamble and the received samples. The base station coordinates joint-transmission of a Random Access Response of the random access procedure with the other base stations in the ACS and transmits the Random Access Response to enable the user equipment to access the wireless communication network.

BRIEF DESCRIPTION OF THE DRAWINGS

The details of one or more aspects of joint-processing of random access channel communications are described below. The use of the same reference numbers in different instances in the description and the figures indicate similar elements.

DETAILED DESCRIPTION

Figure 1:
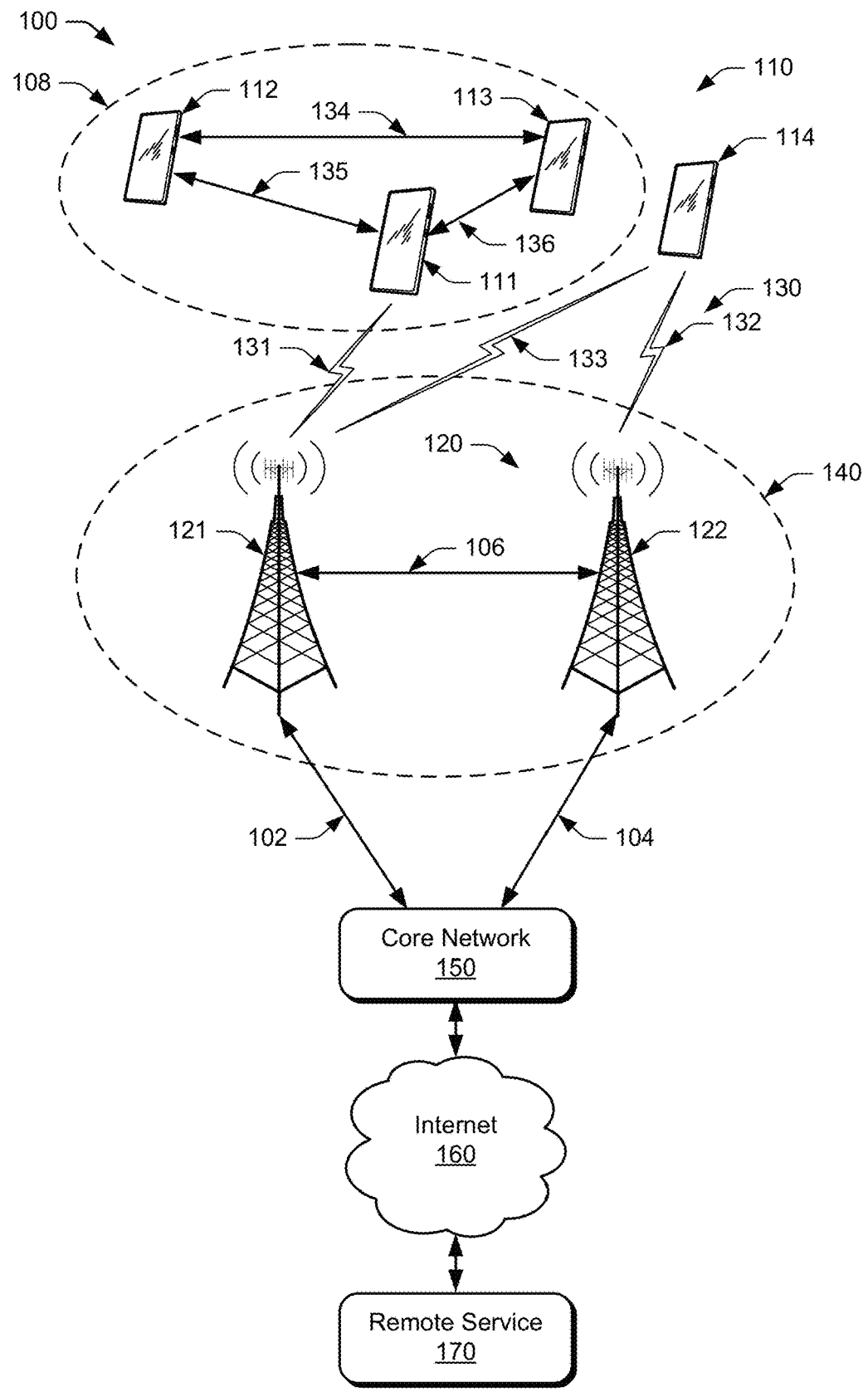
FIG. 1 illustrates an example operating environment in which aspects of joint-processing of random access channel communications can be implemented.

This document describes techniques and apparatuses for joint-processing of random access channel (RACH) communications to improve the reliability and/or the geographic range of a random access procedure for a user equipment (UE). Joint-processing, including joint-transmission and/or joint-reception, by a user equipment-coordination set (UECS) on behalf of a single UE, or by an Active Coordination Set (ACS) of base stations with the single UE, can improve the link budget of RACH communications and facilitate network access for a UE at a greater distance from a base station, when operating in higher frequency bands (e.g., above-6 GHz bands) that experience more severe fading, or in the face of challenging channel conditions.

In one aspect, a base station allocates a RACH resource group configuration for RACH communications with a UECS during a random access procedure. The RACH resource group configuration includes preamble sequences that are specific to RACH transmissions by UECSs and specific time-frequency resources for RACH communication with a UECS. Since joint-transmission and/or joint-reception by a UECS includes communications among the UEs in the UECS over a local wireless network, the base station may configure timings and/or timeouts for communications in a random access procedure that are longer than those expected with a single UE to account for the latencies due to the coordination of joint-transmission and/or joint-reception within the UECS. The base station transmits the RACH resource group configuration information in a System Information Block (SIB). The base station may transmit the RACH resource group configuration information for UECSs along with RACH resource configuration information for individual UEs in the SIB. Any UECS that receives the RACH resource group configuration information in the SIB can use the RACH resource group configuration information to initiate a random access procedure (contention-free or contention-based) with the base station. The base station monitors the specified time-frequency resources to receive RACH transmissions using a specified preamble sequence from any UECS requesting network access.

UEs in a UECS, or not in a UECS, may cache/store RACH resource group configuration information that was previously received (individually by a UE or jointly received by the UECS) when in communication range of a base station(s) to use at a later time when an individual UE may only be able to communicate with the network using the joint-communications capabilities of a UECS. A UE in a UECS may associate and store location information for RACH resource group configuration information for later use to determine which of multiple sets of RACH resource group configuration information are likely candidates to use for a random access procedure. Optionally or additionally, a serving-cell base station may transmit RACH resource group configuration information for neighboring cells in a System Information Block (SIB) to further assist a UECS is accessing the network. The neighbor cells may be in the same or different frequency bands as the serving-cell base station. For example, a sub-1 GHz serving cell may broadcast RACH resource group configuration information for above-6 GHz and millimeter wavelength base stations in its vicinity to assist a UECS in communicating with higher-bandwidth base stations in these higher frequency bands while taking advantage of the propagation characteristics of the sub-1 GHz band to communication the RACH resource group configuration information.

In another aspect, base stations in an ACS coordinate with each other, or with an ACS server in the core network, to allocate a RACH resource set for RACH communications by the UE to access the ACS during a random access procedure. Each RACH resource set configuration includes preamble sequences that are specific to the ACS and specific time-frequency resources for RACH communications with the ACS. The RACH resource set configuration for a given ACS can be communicated to a UE by either a broadcast message from a base station or an ACS, or using dedicated signaling (e.g., in a Radio Resource Control (RRC) message or a Non-Access Stratum (NAS) message). An ACS-specific random access procedure also includes an ACS-specific timing advance and ACS identity that may also be included in a RACH resource set configuration for that ACS. The ACS-specific timing advance depends on the joint-processing mechanism at the ACS. For example, the ACS-specific timing advance can be the maximum timing advance needed by any base station in the ACS. In another example, the ACS-specific timing advance can be the average value of the individual timing advances for each base station in the ACS. In a further example, the ACS-specific timing advance is determined based on the timing advance value of a subset of base stations in the ACS (e.g., the subset of base stations that receive the highest signal strength from the UE). A UE may locally store RACH resource sets for ACSs that the UE has communicated with in the past. The UE can determine which ACS and associated RACH resource set to use for network access based on its current geographic location compared to geographic ranges associated with known ACSs, received broadcast signals from a base station or ACS, or the like. The base stations in an ACS monitor the specified time-frequency resources in the RACH resource set for the ACS and coordinate to jointly process communications received from the UE by the base stations in the ACS. For example, all base stations in the ACS that receive a RACH communication using the specified time-frequency resources forward samples of the received signals to a master base station that jointly processes the samples to receive RACH communications from the UE. The master base station then coordinates joint-transmission of downlink messages during the random access procedure. Since joint-transmission and/or joint-reception by an ACS includes communications among the base stations in the ACS, the master base station may configure timings and/or timeouts for communications in a random access procedure that are longer than those expected between a single base station and a UE to account for the latencies due to joint-transmission and/or joint-reception by the ACS. The random access procedure between the UE and the ACS may be contention-free or contention-based.

In joint-transmission, multiple transmitters (of either UEs 110 or base stations 120) coordinate transmission of signals for the same set of data to increase transmit power, as compared to a single transmitter, and improve the link budget to a receiver. In joint-reception, multiple-receivers (of either UEs 110 or base stations 120) each receive transmitted signals for the same set of data and accumulate the I/Q samples from each of the receivers to decode the combined I/Q samples into the set of data. By using joint-reception, the receivers provide increased receiver sensitivity, as compared to a single receiver, and improve the link budget for receiving the data from a transmitter.

Example Environments

FIG. 1 illustrates an example environment 100, which includes multiple user equipment 110 (UE 110), illustrated as UE 111, UE 112, UE 113, and UE 114. Each UE 110 can communicate with one or more base stations 120 (illustrated as base stations 121 and 122) through one or more wireless communication links 130 (wireless link 130), illustrated as wireless links 131, 132, and 133. Each UE 110 in a UE-coordination set 108 (illustrated as UE 111, UE 112, and UE 113) can communicate with a coordinating UE of the UE-coordination set and/or a target UE in the UE-coordination set using a local wireless network that includes one or more local wireless network connections (e.g., WLAN, Bluetooth, NFC, a personal area network (PAN), WiFi-Direct, IEEE 802.15.4, ZigBee, Thread, millimeter wavelength communication (mmWave), or the like) such as local wireless network connections 134, 135, and 136. A single UE (illustrated as UE 114) can jointly communicate with multiple base stations (illustrated as base stations 121 and 122) in an ACS over multiple wireless links (illustrated as wireless links 132 and 133). Although illustrated as a smartphone, the UE 110 may be implemented as any suitable computing or electronic device, such as a mobile communication device, a modem, cellular phone, gaming device, navigation device, media device, laptop computer, desktop computer, tablet computer, smart appliance, vehicle-based communication system, an Internet-of-things (IoT) device (e.g., sensor node, controller/actuator node, combination thereof), and the like. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, or the like, or any combination thereof.

The base stations 120 communicate with the user equipment 110 using the wireless links 131, 132, and 133, which may be implemented as any suitable type of wireless link. The wireless links 131, 132, and 133 may be beamformed or non-beamformed wireless links. The wireless links 131, 132, and 133 include control and data communication, such as downlink of data and control information communicated from the base stations 120 to the user equipment 110, uplink of other data and control information communicated from the user equipment 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN, or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an Si interface for control-plane signaling and user-plane data communications when connecting to an Evolved Packet Core (EPC) network. The base stations 121 and 122 can communicate using an Xn Application Protocol (XnAP) through an Xn interface or using an X2 Application Protocol (X2AP) through an X2 interface, at 106, to exchange user-plane and control-plane data. The user equipment 110 may connect, via the core network 150, to public networks, such as the Internet 160 to interact with a remote service 170.

The base station 121 providing a cell can specify a set of UEs (e.g., the UE 111, UE 112, and UE 113) to form a UE-coordination set (e.g., the UE-coordination set 108) for joint-transmission and joint-reception of data for a target UE (e.g., the UE 112). The base station 121 may determine, based on information corresponding to the UEs (e.g., UE location, signal level, battery level, and so on), whether coordination is beneficial for a particular UE or not. An effective transmit power of the target UE 112 can increase significantly (e.g., linearly) with the number of UEs in the UE-coordination set, which can greatly improve a link budget of the target UE 112. The base station 121 may determine a UE-coordination set based on various factors, such as a location of each UE relative to the base station 121, distance between the UEs (such as between each other, between each UE and the target UE, or between each UE and a coordinating UE of the UE-coordination set) or a combination thereof. Alternatively, a group of UEs that are individually out of communication range of a base station may configure as a UECS (e.g., by one or more users of the UEs, by discovery of other UEs using the local wireless network, or the like) to improve the link budget for RACH communications for the target UE 112.

The base station 121 may select UE 111 to act as the coordinating UE since the UE 111 is located between UE 112 and UE 113 or because the UE 111 is capable of communicating with each of the other UEs 112 and 113 in the UE-coordination set 108. Alternatively, a group of UEs can form a UECS without the assistance of a base station (e.g., initiated by a user of one of the UEs in the UECS). The UEs coordinate over the local wireless network to select a UE as the coordinating UE based on the capabilities of the UEs in the UECS.

Example Devices

Figure 2:
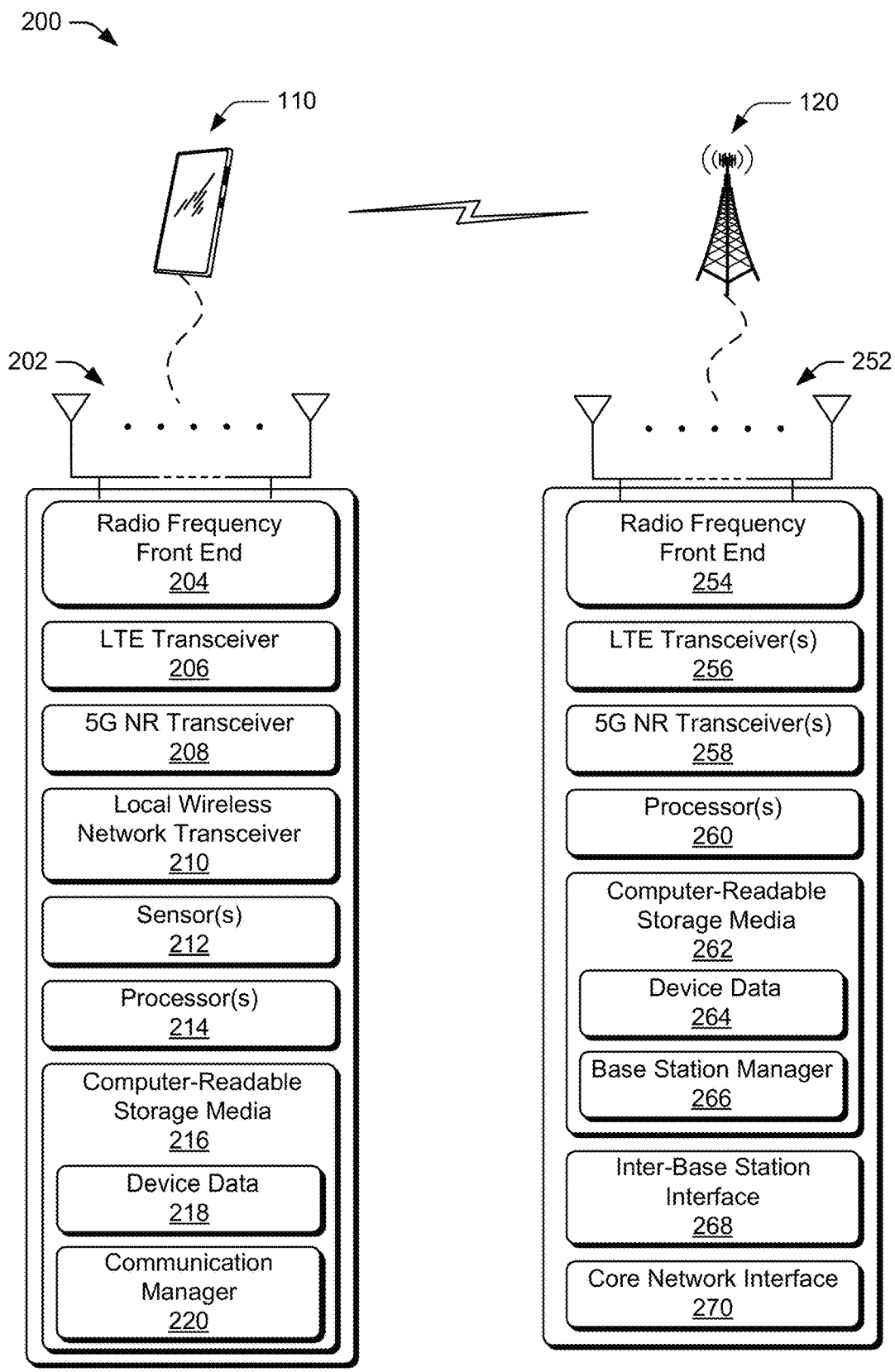
FIG. 2 illustrates an example device diagram of a user equipment and a serving cell base station.

FIG. 2 illustrates an example device diagram 200 of a user equipment and a base station. In aspects, the device diagram 200 describes devices that can implement various aspects of joint-processing of random access channel communications. Included in FIG. 2 are the multiple UE 110 and the base stations 120. The multiple UE 110 and the base stations 120 may include additional functions and interfaces that are omitted from FIG. 2 for the sake of clarity. The UE 110 includes antennas 202, a radio frequency front end 204 (RF front end 204), and radio-frequency transceivers (e.g., an LTE transceiver 206 and a 5G NR transceiver 208) for communicating with base stations 120 in the 5G RAN 141 and/or the E-UTRAN 142. The UE 110 includes one or more additional transceivers (e.g., local wireless network transceiver 210) for communicating over one or more wireless local wireless networks (e.g., WLAN, Bluetooth, NFC, a personal area network (PAN), WiFi-Direct, IEEE 802.15.4, ZigBee, Thread, mmWave, or the like) with at least the coordinating UE, and/or the target UE, of the UE-coordination set. The RF front end 204 of the UE 110 can couple or connect the LTE transceiver 206, the 5G NR transceiver 208, and the local wireless network transceiver 210 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards. In addition, the RF front end 204 can be tuned to, and/or be tunable to, one or more frequency bands defined and implemented by the local wireless network transceiver 210 to support transmission and reception of communications with other UEs in the UE-coordination set over a local wireless network.

The UE 110 includes sensor(s) 212 can be implemented to detect various properties such as temperature, supplied power, power usage, battery state, or the like. As such, the sensors 212 may include any one or a combination of temperature sensors, thermistors, battery sensors, and power usage sensors.

The UE 110 also includes processor(s) 214 and computer-readable storage media 216 (CRM 216). The processor 214 may be a single core processor or a multiple core processor composed of a variety of materials, such as silicon, polysilicon, high-K dielectric, copper, and so on. The computer-readable storage media described herein excludes propagating signals. CRM 216 may include any suitable memory or storage device such as random-access memory (RAM), static RAM (SRAM), dynamic RAM (DRAM), non-volatile RAM (NVRAM), read-only memory (ROM), or Flash memory useable to store device data 218 of the UE 110. The device data 218 includes user data, multimedia data, beamforming codebooks, applications, and/or an operating system of the UE 110, which are executable by processor(s) 214 to enable user-plane communication, control-plane signaling, and user interaction with the UE 110.

CRM 216 also includes a communication manager 220 (e.g., a communication manager application 220). Alternately or additionally, the communication manager 220 may be implemented in whole or part as hardware logic or circuitry integrated with or separate from other components of the UE 110. In at least some aspects, the communication manager 220 configures the RF front end 204, the LTE transceiver 206, the 5G NR transceiver 208, and/or the local wireless network transceiver 210 to implement the techniques described herein.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency bands defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with any UE 110 in a UE-coordination set.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base station manager 266 (e.g., base station manager application 266). Alternately or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the UE 110, as well as communication with a core network. The base stations 120 include an inter-base station interface 268, such as an Xn and/or X2 interface, which the base station manager 266 configures to exchange user-plane and control-plane data between another base station 120, to manage the communication of the base stations 120 with the UE 110. The base stations 120 include a core network interface 270 that the base station manager 266 configures to exchange user-plane and control-plane data with core network functions and entities.

Air Interface Resources

Figure 3:
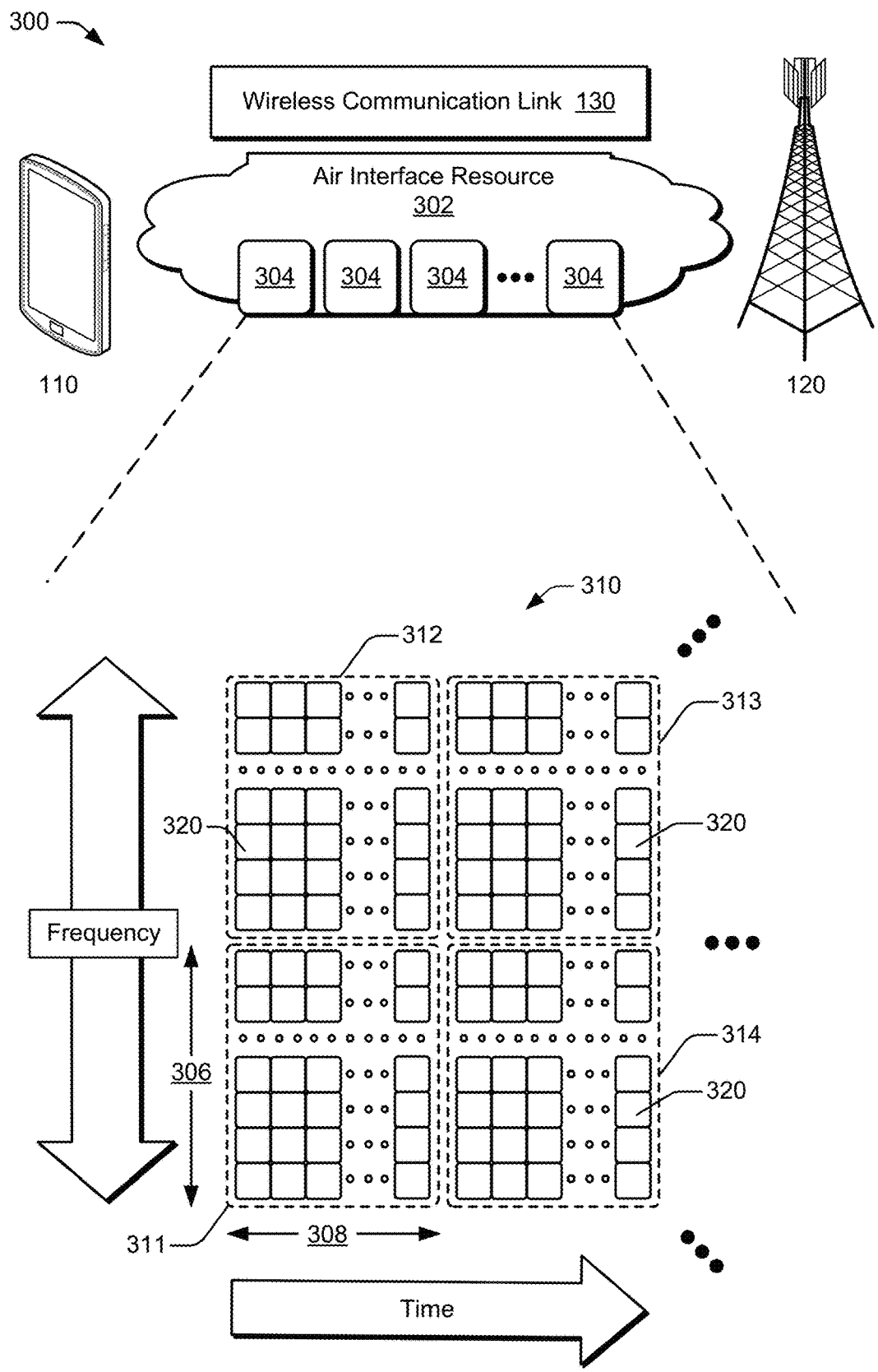
FIG. 3 illustrates an air interface resource that extends between a user equipment and a base station and with which various aspects of joint-processing of random access channel communications can be implemented.

FIG. 3 illustrates an air interface resource that extends between a user equipment and a base station and with which various aspects of joint-processing of random access channel communications can be implemented. The air interface resource 302 can be divided into resource units 304, each of which occupies some intersection of frequency spectrum and elapsed time. A portion of the air interface resource 302 is illustrated graphically in a grid or matrix having multiple resource blocks 310, including example resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface resource 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base stations 120 allocate portions (e.g., resource units 304) of the air interface resource 302 for uplink and downlink communications. Each resource block 310 of network access resources may be allocated to support respective wireless communication links 130 of multiple user equipment 110. In the lower left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or seven orthogonal frequency-division multiplexing (OFDM) symbols). The time interval 308 includes subintervals that may each correspond to a symbol, such as an OFDM symbol. As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth.

In example implementations, multiple user equipment 110 (one of which is shown) are communicating with the base stations 120 (one of which is shown) through access provided by portions of the air interface resource 302. The base station manager 266 (shown in FIG. 2) may determine a respective data-rate, type of information, or amount of information (e.g., data or control information) to be communicated (e.g., transmitted) by the user equipment 110. For example, the base station manager 266 can determine that each user equipment 110 is to transmit at a different respective data rate or transmit a different respective amount of information. The base station manager 266 then allocates one or more resource blocks 310 to each user equipment 110 based on the determined data rate or amount of information.

Additionally, or in the alternative to block-level resource grants, the base station manager 266 may allocate resource units at an element-level. Thus, the base station manager 266 may allocate one or more resource elements 320 or individual subcarriers to different user equipment 110. By so doing, one resource block 310 can be allocated to facilitate network access for multiple user equipment 110. Accordingly, the base station manager 266 may allocate, at various granularities, one or up to all subcarriers or resource elements 320 of a resource block 310 to one user equipment 110 or divided across multiple user equipment 110, thereby enabling higher network utilization or increased spectrum efficiency.

The base station manager 266 can therefore allocate air interface resource 302 by resource unit 304, resource block 310, frequency carrier, time interval, resource element 320, frequency subcarrier, time subinterval, symbol, spreading code, some combination thereof, and so forth. Based on respective allocations of resource units 304, the base station manager 266 can transmit respective messages to the multiple user equipment 110 indicating the respective allocation of resource units 304 to each user equipment 110. Each message may enable a respective user equipment 110 to queue the information or configure the LTE transceiver 206, and/or the 5G NR transceiver 208 to communicate via the allocated resource units 304 of the air interface resource 302.

User Equipment-Coordination Set Random Access Procedure

A UE-coordination set is formed by multiple UEs assigned as a group to function together, similarly to a distributed antenna, for the benefit of a particular UE. The UE-coordination set includes a coordinating UE that coordinates joint-transmission and reception of downlink and/or uplink data for the particular UE (e.g., target UE) or multiple UEs in the UE-coordination set. By combining antennas and transmitters of multiple UEs in the UE-coordination set, the effective transmit power of the particular UE is significantly increased, and the effective signal quality is greatly improved.

Multiple UEs in the UECS can each receive downlink data transmissions from the base station. Unlike conventional relay techniques, these UEs do not decode the downlink transmissions into data packets and then forward the data packets to a destination. Rather, the UEs demodulate and sample the downlink transmissions to produce I/Q samples. The UEs determine where to forward the I/Q samples of the downlink transmissions, such as to a coordinating UE or a target UE for decoding. In aspects, the target UE may be included in a subset of target UEs within the UE-coordination set. The coordinating UE (or the target UE) receives the I/Q samples from the other UEs in the UE-coordination set and stores the I/Q samples in a buffer memory for decoding. Then, the coordinating UE (or the target UE) synchronizes and decodes the stored I/Q samples into data packets for the target UE(s). Accordingly, the processing of the I/Q samples occurs at the coordinating UE or the target UE. In this way, the UE-coordination set acts as a distributed antenna for the target UE. The target UE may include its own antenna(s) and participate in the reception, demodulation, and sampling of downlink transmissions from the base stations.

Similar to the downlink situation described, multiple UEs can also form a UE-coordination set to transmit a message to a base station at a higher effective transmit power than would be possible for an individual UE. For example, multiple UEs in the UECS each use their respective antennas and transmitters to transmit uplink data from a target UE on air interface resources as directed by the base station coordinating the UECS. In this way, the target UE's uplink data can be processed together and transmitted using the transmitters and the transmission antennas of multiple (including all) UEs in the UECS. In an example, the target UE uses its local wireless network transceiver 210 to transmit uplink data to the coordinating UE. The coordinating UE uses its local wireless network transceiver 210 to distribute the data to the other UEs in the UECS. Then, all the UEs in the UECS process and transmit the uplink data to the base station. In this way, the distributed transmission provides for a better effective link budget given the channel impairments encountered by the target UE.

Figure 4:
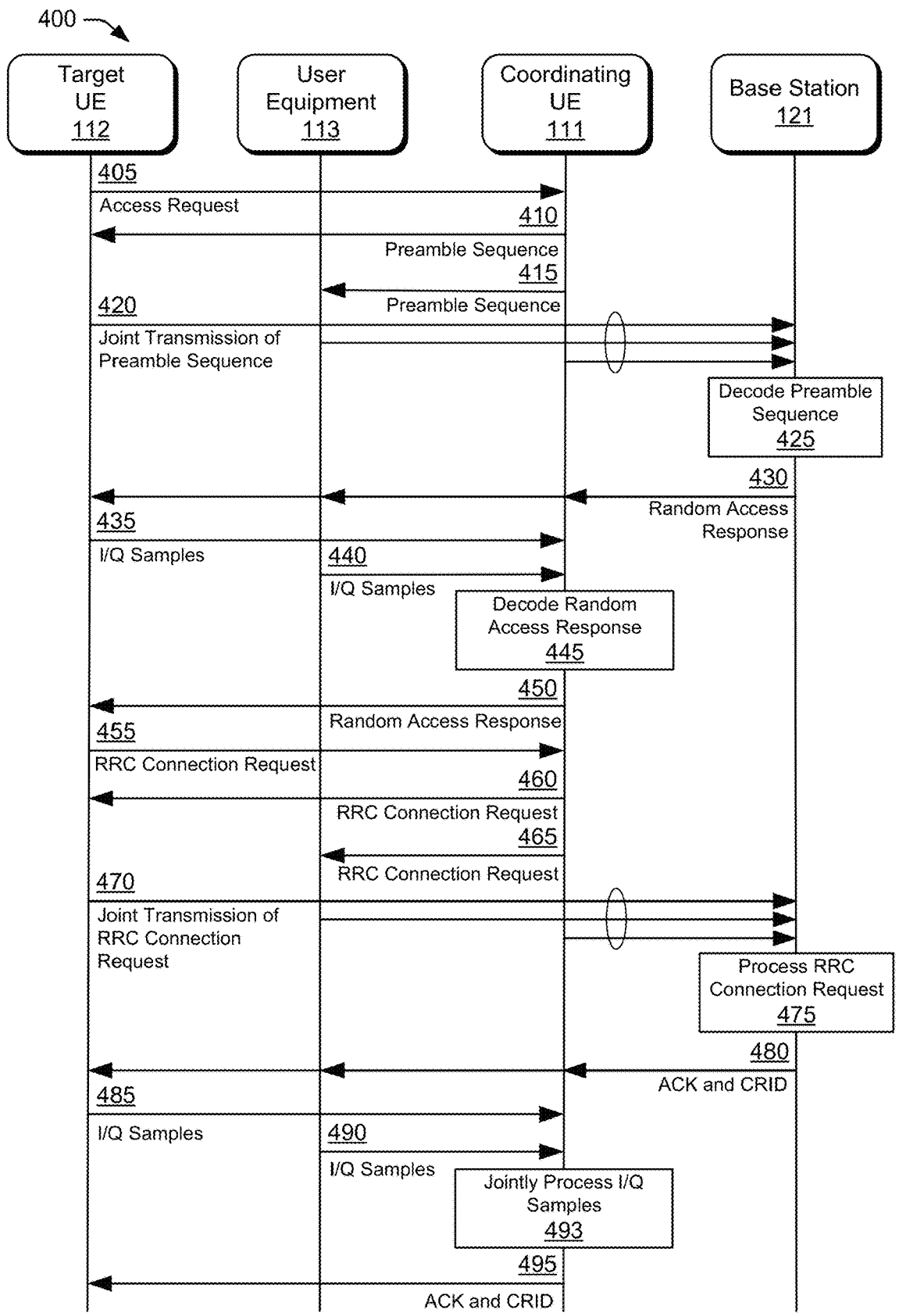
FIG. 4 illustrates example data and control transactions between user equipments of a user-equipment coordination set and a base station for random access procedures in accordance with aspects of joint-processing of random access channel communications can be implemented.

FIG. 4 illustrates example data and control transactions 400 between user equipments of a user-equipment-coordination set and a base station for a random access procedure in accordance with aspects of joint-processing of random access channel communications. When the target UE 112 wants to request access to the RAN 140, the target UE 112 transmits an indication of the access request to the coordinating UE 111, at 405. The coordinating UE 111 uses the local wireless network to distribute a preamble sequence (which is referred to herein as a Random Access Preamble, but may also be known in the relevant 3GPP standards as message one or Msg1) as I/Q samples and an indication of time-frequency resources to use for the RACH communication to the UE 112, at 410, and the UE 113, at 415. At 420, the UEs 111, 112, and 113 jointly transmit the preamble sequence to the base station 121. At 425, the base station 121 receives the jointly transmitted preamble sequence from the UEs 111, 112, and 113 and processes the combined signals to decode the preamble sequence from the UECS 108. At 430, the base station 121 transmits a Random Access Response (a message 2, a Msg2) to the UEs 111, 112, and 113 that is received and sampled by the UEs 111, 112, and 113. At 435, the UE 112 transmits the I/Q samples corresponding to the received Random Access Response to the coordinating UE 111. At 440, the UE 113 transmits the I/Q samples corresponding to the received Random Access Response to the coordinating UE 111. At 445, the coordinating UE 111 jointly processes the received I/Q samples from the UEs 112 and 113, with I/Q samples of the Random Access Response received by the coordinating UE 111, to jointly receive the Random Access response. If the random access procedure is a contention-free random access procedure, the random access procedure terminates at 450 with the coordinating UE 111 transmitting the Random Access Response to the UE 112 using the local wireless network.

If the random access procedure is a contention-based random access procedure, the random access procedure continues, at 455, with the UE 112 transmitting a Radio Resource Control (RRC) Connection Request (a message 3, a Msg3) to the coordinating UE 111. The coordinating UE 111 uses the local wireless network to distribute the RRC Connection Request as I/Q samples and an indication of time-frequency resources to use for the RACH communication to the UE 112, at 460, and the UE 113, at 465. At 470, the UEs 111, 112, and 113 jointly transmit the RRC Connection Request to the base station 121. At 475, the base station 121 receives the jointly transmitted RRC Connection Request from the UEs 111, 112, and 113 and processes the combined signal to decode the RRC Connection Request from the UECS 108. At 480, the base station 121 transmits an Acknowledgement (ACK) and Contention Resolution Identifier (CRID) (a message 4, or a Msg4) to the UEs 111, 112, and 113 that is received and sampled by the UEs 111, 112, and 113. At 485, the UE 112 transmits the I/Q samples corresponding to the received ACK and CRID to the coordinating UE 111. At 490, the UE 113 transmits the I/Q samples corresponding to the received ACK and CRID to the coordinating UE 111. At 493, the coordinating UE 111 jointly processes the received I/Q samples from the UEs 112 and 113, with I/Q samples of the ACK and CRID received by the coordinating UE 111, to jointly receive the ACK and CRID and, at 495, the coordinating UE 111 transmits the ACK and CRID to the UE 112 using the local wireless network.

In one aspect, the base station 121 allocates a RACH resource group configuration for RACH communications with the UECS 108. The RACH resource group configuration includes preamble sequences for the Random Access Preamble that are specific to RACH transmissions by UECSs and specific time-frequency resources for RACH communication from any UECS. The base station 121 transmits the RACH resource group configuration information to the UECS in a System Information Block (SIB). The UECS 108 receives the RACH resource group configuration information included in the SIB and uses the RACH resource group configuration information to initiate a random access procedure (contention-free or contention-based) with the base station 121. The base station 121 monitors the specified time-frequency resources to receive RACH transmissions using a specified RACH sequence from the UECS 108.

UEs within the UECS 108 coordinate with each other to select a preamble sequence to use for the UECS 108. For example, the coordinating UE 111 can decide on the preamble sequence and time-frequency resources, and notify the rest of UEs (112, 113) in the UECS 108 using the local wireless network. The coordinating UE 111 determines the timing (e.g., slots and symbols) for joint-transmission of RACH communications (e.g., the Random Access Preamble) to the base station 121. The coordinating UE 111 determines the initial transmit power level of each UE in the UECS 108 for the RACH transmissions. This determination could be based on the number of UEs in the UECS that will jointly transmit, the maximum transmission power available from each jointly-transmitting UE in the UECS, the available battery level of any UE in the UECS, the beamsteering capability of any UE in the UECS, and/or various other factors.

The base station 121 allocates a group RACH Radio Network Temporary Identity (RNTI) to the target UE 112, such that the UECS 108 (each UE in the UECS 108) can use that RACH RNTI to receive the Random Access Response (message two, Msg2) of the random access procedure. The coordinating UE 111 is responsible for setting a backoff timer to determine if the first attempt of initiating the random access procedure fails (e.g., the Random Access Response is not received before the backoff timer expires). Due to latencies for coordination and joint-processing within the UECS 108, the coordinating UE 111 can set the time value for the backoff timer to be longer than would be set by an individual UE performing a random access procedure. The coordinating UE 111 also determines the transmit power for each UE in the UECS 108 for further random access attempts if the first attempt fails (e.g., the Random Access Response is not received by the UECS 108).

The coordinating UE 111 determines the timing advance that each UE uses to transmit each of any additional messages in the random access procedure (e.g., the Radio Resource Control (RRC) Connection Request, the message 3, the Msg3, the Acknowledgement (ACK) and Contention Resolution ID (CRID), the message 4, or the Msg4). For example, the coordinating UE 111 can determine that every UE in UECS 108 will use the same timing advance. In another example, the coordinating UE 111 can command each UE to use a different timing advance (to adjust each individual UE's uplink timing). In a further example, the coordinating UE 111 can create a set of timing advance values and a subset of UEs can share the same timing advance values. The coordinating UE 111 also determines the random identity used in the Radio Resource Control (RRC) Connection Request (message 3, Msg3) that the UECS jointly transmits for contention resolution.

Active Coordination Set Random Access Procedure

Figure 5:
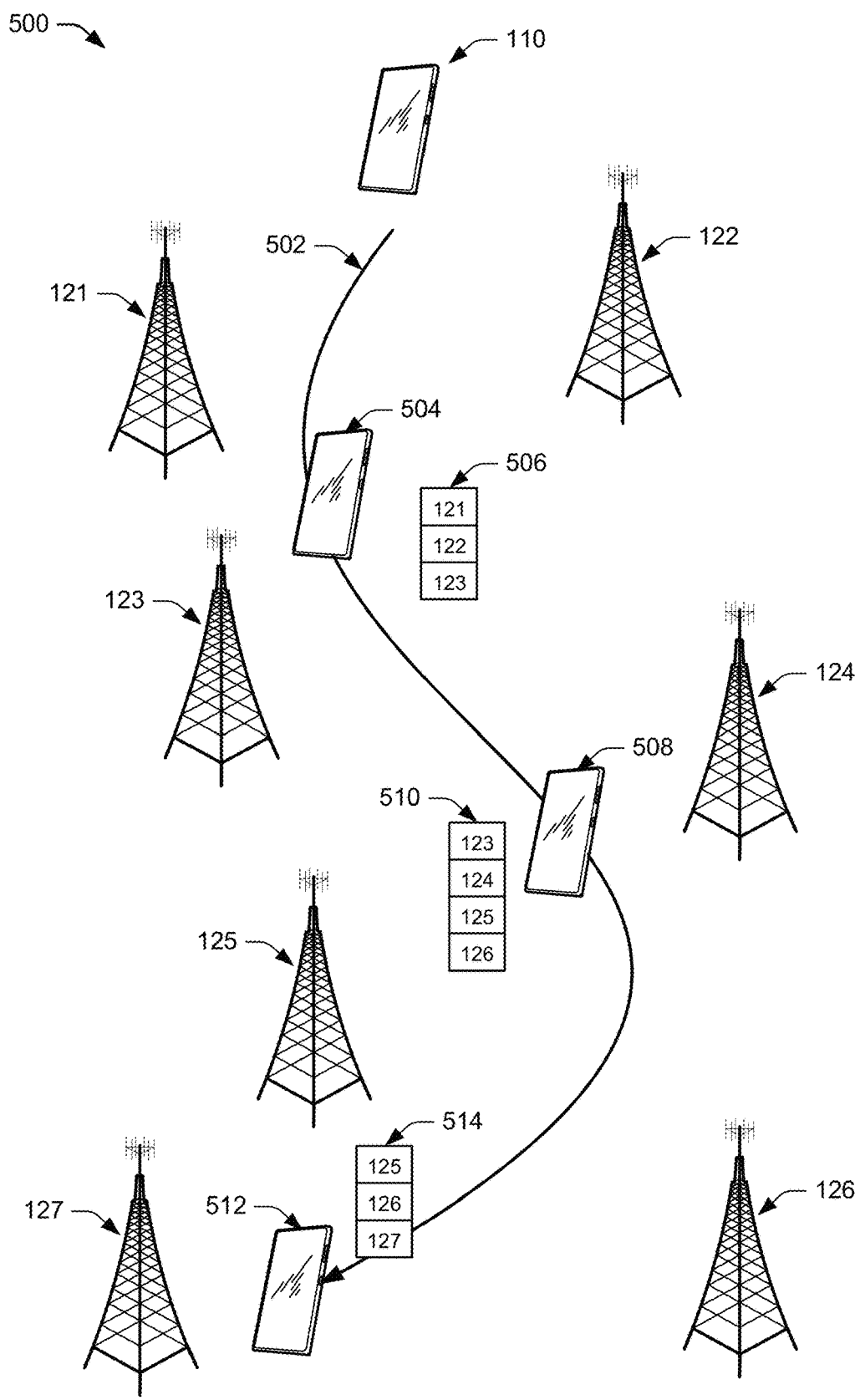
FIG. 5 illustrates an example environment for an ACS in which various aspects of joint-processing of random access channel communications can be implemented.

FIG. 5 illustrates an example environment 500 in which a user equipment 110 is moving through a radio access network (RAN) that includes multiple base stations 120, illustrated as base stations 121-127. These base stations may utilize different technologies (e.g., LTE, 5G NR, 6G) at a variety of frequencies (e.g., sub-gigahertz, sub-6 GHz, and above 6 GHz bands and sub-bands). An ACS is a set of base stations, determined by a UE, that perform coordinated communication with the UE, such as by using joint-transmission and/or joint-reception by the base stations in the ACS to communicate with the UE.

For example, the user equipment 110 follows a path 502 through the RAN 140. The user equipment 110 periodically measures the link quality (e.g., of base stations that are currently in the ACS and candidate base stations that the UE 110 may add to the ACS). For example, at position 504, the ACS at 506 includes the base stations 121, 122, and 123. As the UE 110 continues to move, at position 508, the UE 110 has deleted base station 121 and base station 122 from the ACS and added base stations 124, 125, and 126, as shown at 510. Continuing along the path 502, the UE 110, at position 512, has deleted the base stations 123 and 124 and added the base station 127, as shown in the ACS at 514.

Figure 6:
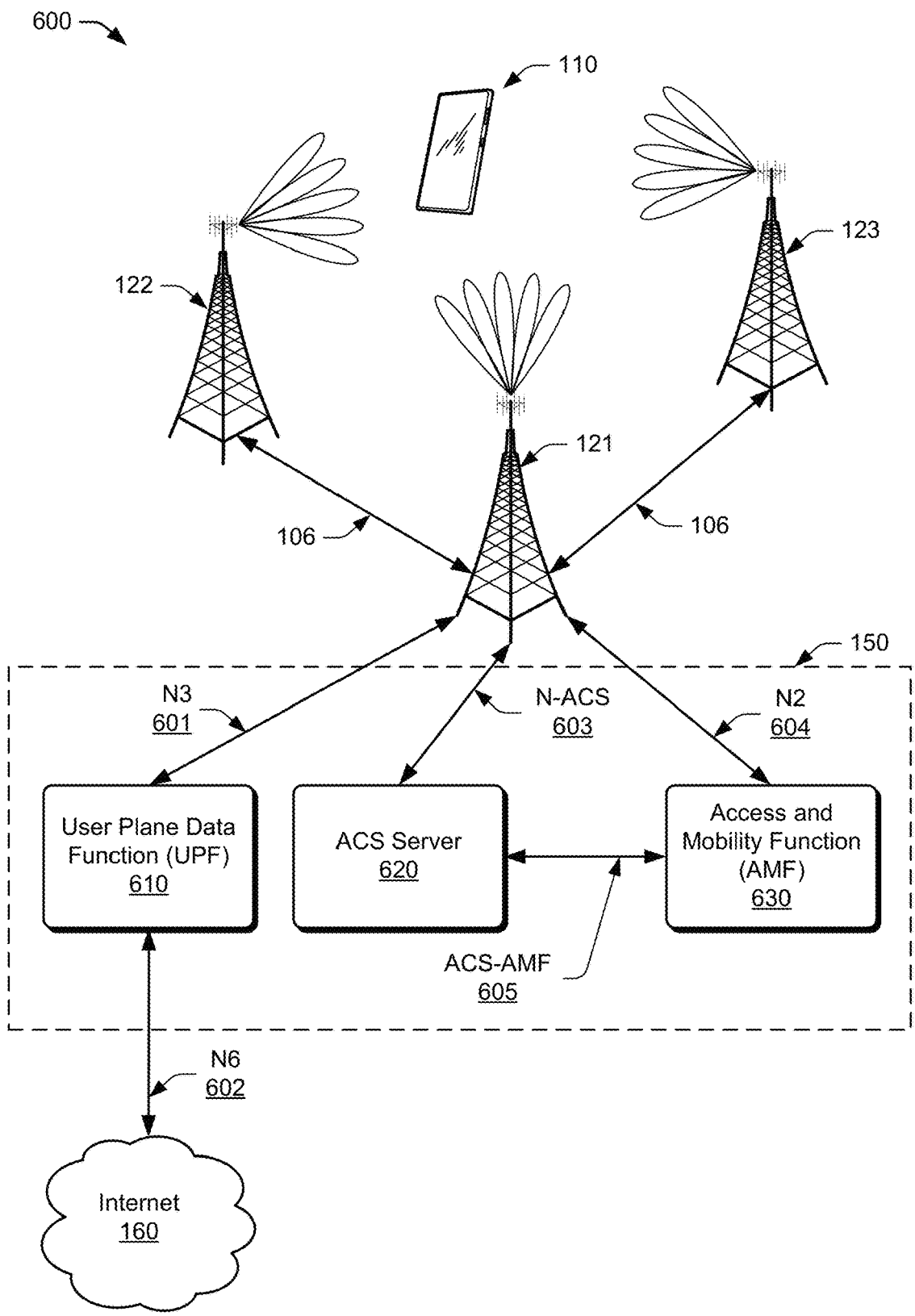
FIG. 6 illustrates another example environment for an ACS in which various aspects of joint-processing of random access channel communications can be implemented.

FIG. 6 illustrates an example environment 600 in which various aspects of joint-processing of random access channel communications can be implemented. The user equipment 110 is engaged in joint transmission and/or reception (joint communication) with the three base stations 121, 122, and 123. Although communications with the base stations 121, 122, and 123 are illustrated as beamformed communications, beamforming is not required to implement aspects of an ACS or joint-processing of random access channel communications. The base station 121 is acting as a master base station for the joint transmission and/or reception.

Which base station is the master base station is transparent to the UE 110, and the master base station can change as base stations are added and/or removed from the ACS. The ACS may be a component of, or used to implement, a user-centric no-cell (UCNC) network architecture. The master base station coordinates control-plane and user-plane communications for the joint communication with the UE 110 via the Xn interfaces 106 (or a similar 6G interface) to the base stations 122 and 123 and maintains the user-plane context between the UE 110 and the core network 150. The coordination may be performed using proprietary or standards-based messaging, procedures, and/or protocols.

The master base station schedules air interface resources for the joint communication for the UE 110 and the base stations 121, 122, and 123 based on the ACS associated with the UE 110. The master base station (base station 121) connects, via an N3 interface 601 (or a 6G equivalent interface), to the User Plane Function 610 (UPF 610) in the core network 150 for the communication of user plane data to and from the user equipment 110. The master base station distributes the user-plane data to all the base stations in the joint communication via the Xn interfaces 106. The UPF 610 is further connected to a data network, such as the Internet 160 via the N6 interface 602.

UE 110 downlink data can be sent from all of the base stations 120 in the ACS or any subset of the base stations 120 in the ACS. The master base station 121 determines which combination of base stations 120 in the ACS to use to transmit downlink data to the UE 110. The selection of base stations 120 to use to transmit downlink data can be based on one or more factors, such as application quality of service (QoS) requirements, location of the UE 110, velocity of the UE 110, a Reference Signal Received Power (RSRP), a Received Signal Strength Indicator (RSSI), interference, or the like. UE 110 uplink data can be received by all of the base stations 120 in the ACS or any subset of the base stations 120 in the ACS.

Similarly to downlink data, the master base station 121 determines which combination of base stations 120 in the ACS to use to receive uplink data from the UE 110. The selection of base stations 120 to use to receive uplink data can be based on one or more factors, such as application QoS requirements, location of the UE 110, velocity of the UE 110, RSRP, RSSI, interference, or the like. Typically, the combination of base stations 120 for downlink transmission and uplink reception will be identical, although different combinations of base stations 120 may be used for downlink transmission and uplink reception.

When the user equipment 110 creates or modifies an ACS, the user equipment 110 communicates the ACS or the ACS modification to an ACS Server 620 that stores the ACS for each user equipment 110 operating in the RAN 140. Additionally or optionally, the UE 110 can communicate the RACH resource set for an ACS to the ACS Server 620. Although shown in the core network 150, alternatively the ACS Server 620 may be an application server located outside the core network 150. The user equipment 110 communicates the ACS or ACS modification via the master base station (base station 121) which is connected to the ACS Server 620 via an N-ACS interface 603. Optionally or alternatively, the user equipment 110 communicates the ACS or ACS modification to the ACS Server 620 via the Access and Mobility Function 630 (AMF 630) which is connected to the master base station (base station 121) via an N2 interface 604. The AMF 630 relays ACS-related communications to and from the ACS Server 620 via an ACS-AMF interface 605. ACS data between the user equipment 110 and the ACS Server 620 can be communicated via Radio Resource Control (RRC) communications, Non-Access Stratum (NAS) communications, or application-layer communications.

In an aspect, base stations in an ACS coordinate with each other or with the ACS Server 620 to allocate a RACH resource set for RACH communications by the UE during random access procedures with the ACS. Each RACH resource set includes preamble sequences that are specific to the ACS and specific time-frequency resources for RACH communications with the ACS. The RACH resource set for a given ACS can be communicated to the UE 110 by either a broadcast message from one or more base stations in the ACS or using dedicated signaling (e.g., in a Radio Resource Control (RRC) message or a Non-Access Stratum (NAS) message). An ACS-specific RACH procedure may also include an ACS-specific timing advance and an ACS identity. The UE 110 may locally store the RACH resource sets for ACSs that the UE 110 has communicated with in the past. The UE 110 can determine which ACS and associated RACH resource set to use for network access based on its current geographic location compared to locations of known ACSs, received broadcast signals from a base station or ACS, or the like. The base stations in an ACS monitor the specified time-frequency resources in the RACH resource set and coordinate to jointly process communications received using the time-frequency resources in the RACH resource set. For example, all base stations in the ACS that receive a random access communication forward samples of the received signals to the master base station that jointly processes the samples to receive RACH communications from the UE. The master base station then coordinates joint-transmission of downlink messages during the random access procedure. The random access procedure between the UE and the ACS may be contention-free or contention-based. Optionally or additionally, the allocated RACH resource set may depend upon whether the RACH procedure is contention-free or contention-based.

One or more base stations in the ACS jointly transmit the RACH resource set in a broadcast message or use dedicated signaling (e.g., in a Radio Resource Control (RRC) message or a Non-Access Stratum (NAS) message) to the UE. Each ACS in the RAN 140 transmits a RACH resource set that is unique to the particular ACS or is different from neighboring ACSs.

The UE 110 monitors downlink signals from base stations in the ACS to receive the RACH resource set for that ACS. The UE uses the RACH resource set that is specific to the ACS for a random access procedure to access the RAN 140 using the base stations in the ACS.

When the base stations within a specific ACS receive an ACS-specific random access communication (using joint-reception), the base stations coordinate for joint-transmission of the Random Access Response (message 2, Msg2) of the random access procedure and jointly communicate any later messages (e.g., a Radio Resource Control (RRC) Connection Request, a message 3, a Msg3, an Acknowledgement (ACK) and Contention Resolution ID (CRID), a message 4, or a Msg4) required to complete the random access procedure. For example, the base stations in the ACS jointly receive the RRC Connection Request message and jointly transmit message 4 of the random access procedure for contention resolution. The ACS random access procedure also includes an ACS-specific timing advance and an ACS-specific UE identity. Each UE has a specific identity (ACS RNTI) associated with each different ACS. For a contention-less random access procedure, one or more base stations in ACS can communicate with the UE using the ACS RNTI of the UE.

Example Methods

Example methods 700 and 800 are described with reference to FIGS. 7 and 8 in accordance with one or more aspects of joint-processing of random access channel communications. The order in which the method blocks are described are not intended to be construed as a limitation, and any number of the described method blocks can be skipped, repeated, or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
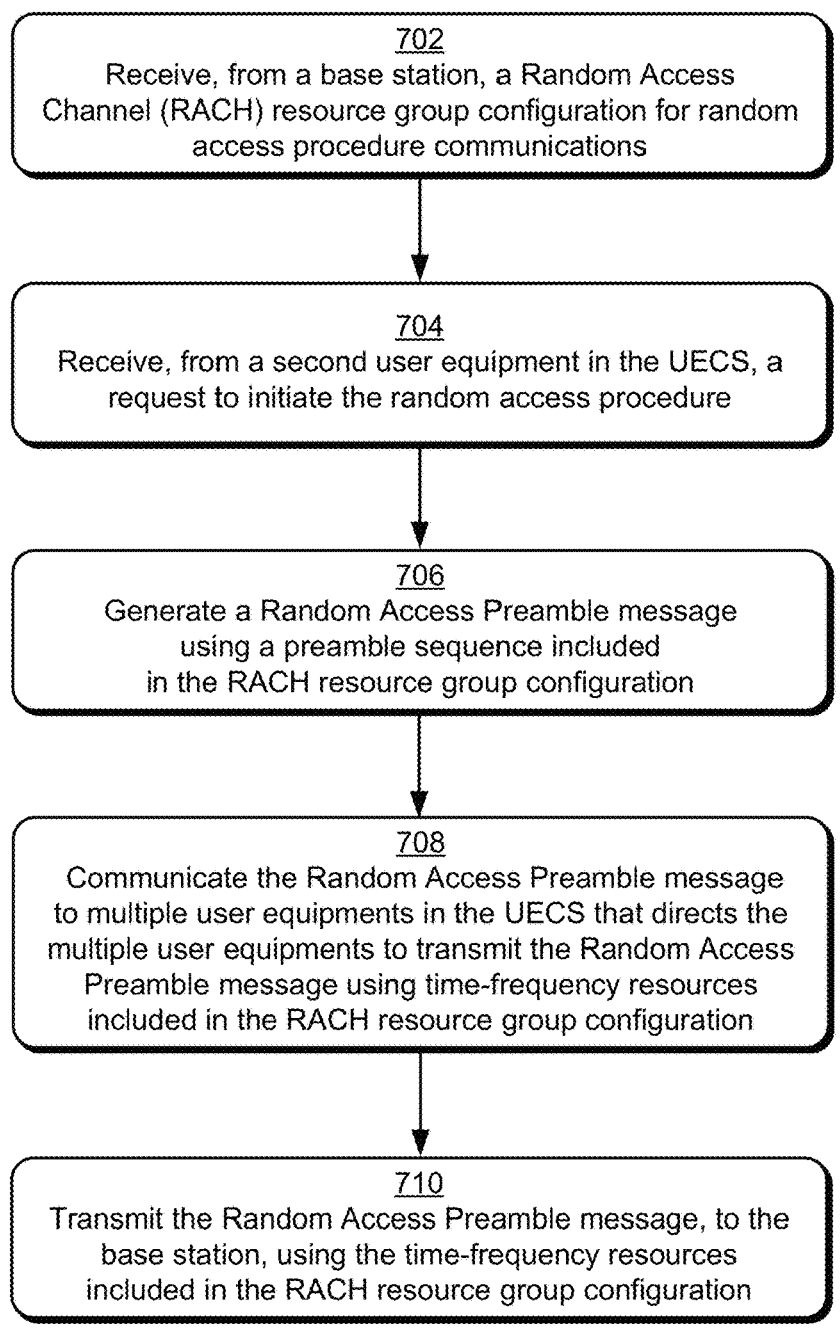
FIG. 7 illustrates an example method of joint-processing of random access channel communications as generally related to a coordinating user equipment of a UECS in accordance with aspects of the techniques described herein.

FIG. 7 illustrates example method(s) 700 of joint-processing of random access channel communications as generally related to a coordinating user equipment in a UECS. At 702, a coordinating user equipment receives, from a base station, a Random Access Channel (RACH) resource group configuration for random access procedure communications. For example, a coordinating user equipment (e.g., the coordinating UE 111) receives, from a base station (e.g., the base station 121), a RACH resource group configuration for random access procedure communications. The RACH resource group configuration includes one or more preamble sequences and time-frequency resources for RACH communications.

At 704, the coordinating user equipment receives, from a second user equipment in the UECS, a request to initiate the random access procedure. For example, the coordinating user equipment 111 receives, from a second user equipment (e.g., the UE 112) in the UECS 108, a request to initiate the random access procedure to enable the UE 112 to access the RAN 140. The second user equipment may be a target UE or, in other words, a UE that utilizes the UECS to perform a random access procedure.

At 706, the coordinating user equipment generates a Random Access Preamble message using a preamble sequence included in the RACH resource group configuration. For example, the coordinating UE 111 generates a Random Access Preamble message using a preamble sequence included in the RACH resource group configuration. The coordinating UE 111 may select a preamble sequence from multiple preamble sequences included in the RACH resource group configuration.

At 708, the coordinating user equipment communicates the Random Access Preamble message to multiple user equipments in the UECS that directs the multiple user equipments to transmit the Random Access Preamble message using a first set of time-frequency resources indicated in the RACH resource group configuration. For example, the coordinating user equipment 111 communicates the Random Access Preamble message, using the local wireless network, to multiple user equipments (e.g., UE 112, UE 113) in the UECS 108 that directs the multiple user equipments to transmit the Random Access Preamble message using the first set of time-frequency resources indicated in the RACH resource group configuration. The coordinating UE 111 communicates the Random Access Preamble message as a set of I/Q samples for joint-transmission by the UE 112 and UE 113. The coordinating UE 111 may also communicate the first set of time-frequency resources to the multiple user equipments in the UECS. In this manner, the coordinating UE causes the other UEs to transmit the Random Access Preamble message using the first set of time-frequency resources.

At 710, the coordinating user equipment transmits the Random Access Preamble message, to the base station, using the time-frequency resources. For example, the coordinating user equipment 111 transmits the Random Access Preamble message, to the base station 121, using the time-frequency resources indicated in the RACH resource group configuration. The coordinating UE 111 synchronizes transmission of the Random Access Preamble message with the transmission of the UE 112 and UE 113 to jointly transmit the Random Access Preamble message with an effectively higher transmit power. For example, the coordinating UE 111 and the other UEs 112, 113 in the UECS may transmit the Random Access Preamble message at the same time, using the same frequency resources, such that constructive interference between the respective transmissions results in a higher transmit power.

Figure 8:
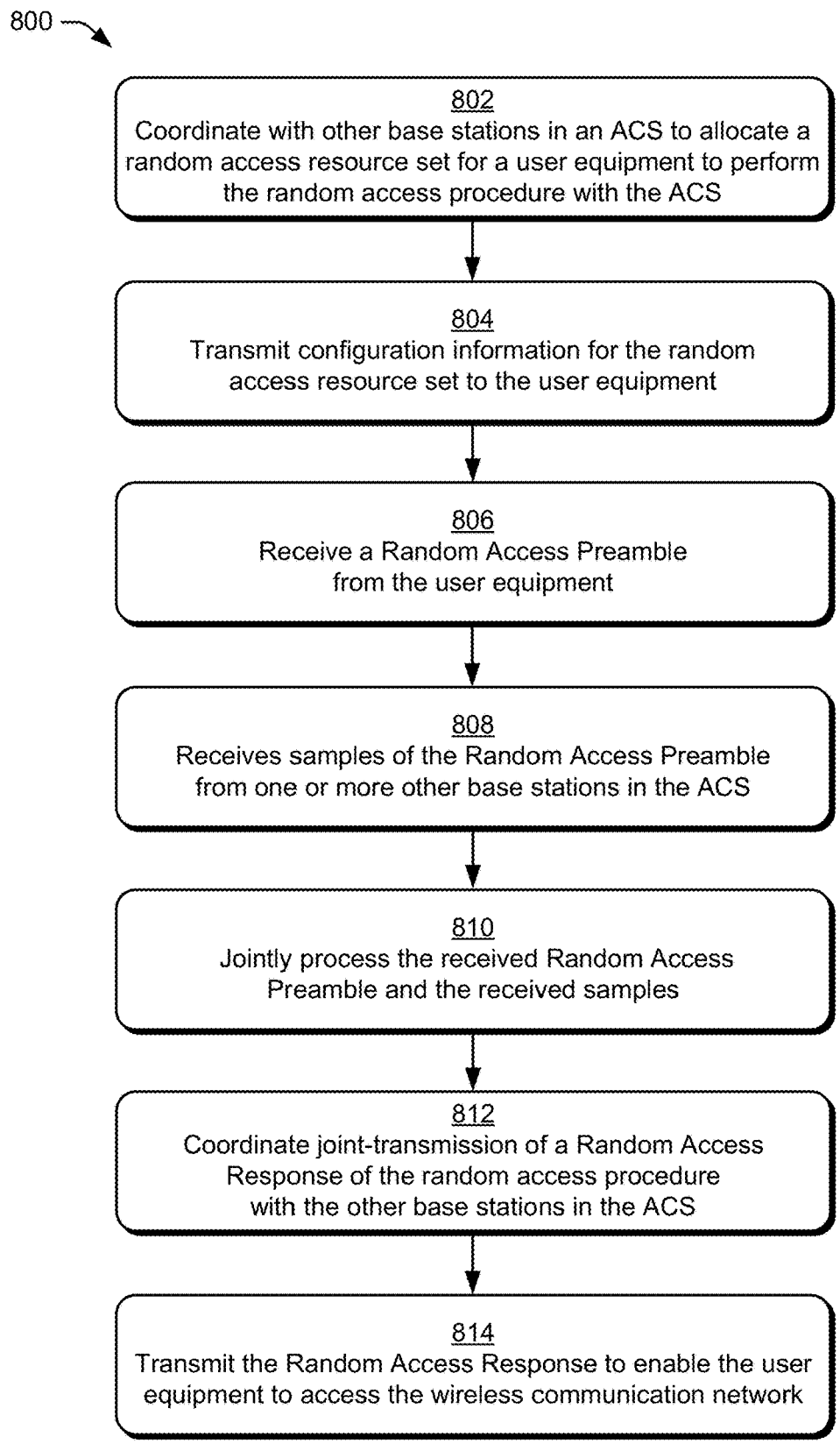
FIG. 8 illustrates an example method of joint-processing of random access channel communications as generally related to a base station in an ACS in accordance with aspects of the techniques described herein.

FIG. 8 illustrates example method(s) 800 of joint-processing of random access channel communications as generally related to a base station in an ACS. At 802, a base station coordinates with other base stations in an ACS to allocate a random access resource set for a user equipment to perform the random access procedure with the ACS. For example, a base station (e.g., the base station 121) coordinates with other base stations (e.g., the base station 122, the base station 123) in an ACS to allocate a random access resource set for a user equipment (e.g., the user equipment 110) to perform the random access procedure with the ACS. The base station 121 coordinates with the base stations 122 and 123 using an Xn or X2 interface.

At 804, the base station transmits configuration information for the random access resource set to the user equipment. For example, the base station 121 transmits (or multiple base stations in the ACS jointly transmit) configuration information for the random access resource set to the user equipment 110. The configuration information for random access resource set includes preamble sequences that are specific to the ACS and time-frequency resources for RACH communications with the ACS.

At 806, the base station receives a Random Access Preamble from the user equipment on the random access resource set using an ACS-specific preamble sequence. If the UE previously received an ACS-specific timing advance and an ACS identity, the Random Access Preamble may also reflect the ACS-specific timing advance and incorporate the ACS identity. At 808, the base station receives samples of the Random Access Preamble from one or more other base stations in the ACS. For example, the base stations 121, 122, and 123 jointly receive the Random Access Preamble from the user equipment 110. The base stations 122 and 123 send I/Q samples of the received Random Access Preamble to the base station 121 using the Xn or X2 interface.

At 810, the base station jointly processes the received Random Access Preamble and the received samples. For example, the base station 121 jointly processes the received Random Access Preamble and the samples of the Random Access Preamble received from the base stations 122 and 123 to decode the Random Access Preamble.

At 812, the base station coordinates joint-transmission of a Random Access Response of the random access procedure with the other base stations in the ACS. For example, the base station 121 generates a Random Access Response and forwards the Random Access Response to be jointly transmitted to the base stations 122 and 123. The base station 121 may also communicate timing information for the joint transmission of the Random Access Response.

At 814, the base station transmits the Random Access Response to enable the user equipment to access the wireless communication network. For example, the base station 121, in synchronization with the base stations 122 and 123, transmits the Random Access Response to jointly transmit the Random Access Response with an effectively higher transmit power. For example, the coordinating base station 121 and the other base stations 122, 123 in the ACS may transmit the Random Access Response at the same time, using the same frequency resources, such that constructive interference between the respective transmissions results in a higher transmit power.

The methods 700 and 800 may be performed together or may be performed independently of each other. In an example where the methods are performed together, a UECS can transmit a Random Access Preamble to the ACS in accordance with method 700. The ACS may receive the Random Access Preamble from the UECS, and transmit a Random Access Response to the UECS, in accordance with method 800. By combining the methods 700 and 800, both the Random Access Preamble and the Random Access Response can be transmitted with an effectively higher transmit power. This can improve performance of RACH communications when the quality of service between a UE and a base station is degraded, such as when a target UE is at a cell edge.

In the following some examples are described:

Example 1: A method for accessing a wireless communications network using a random access procedure, by a first user equipment, UE, configured as a coordinating user equipment for a user equipment-coordination set, UECS, the method comprising the coordinating user equipment:
  receiving, from a base station, a Random Access Channel, RACH, resource group configuration for random access procedure communications;
  receiving, from a second UE in the UECS, a request to initiate the random access procedure;
  generating a Random Access Preamble message using a preamble sequence included in the RACH resource group configuration;
  communicating the Random Access Preamble message to multiple user equipments in the UECS that directs the multiple user equipments to transmit the Random Access Preamble message using a first set of time-frequency resources indicated in the RACH resource group configuration; and
  transmitting the Random Access Preamble message to the base station using the time-frequency resources.

Example 2: The method of example 1, wherein receiving the RACH resource group configuration comprises:
  receiving the RACH resource group configuration in a System Information Block, SIB, from the base station.

Example 3: The method of example 1 or example 2, wherein the RACH resource group configuration includes multiple preamble sequences, and wherein generating the Random Access Preamble message comprises:
  selecting the preamble sequence, from the multiple preamble sequences, for inclusion in the Random Access Preamble message.

Example 4: The method of any one of examples 1 to 3, wherein the RACH resource group configuration includes multiple RACH time-frequency resources, and wherein generating a Random Access Preamble message comprises the coordinating user equipment:
  selecting the time-frequency resources from the multiple RACH time-frequency resources.

Example 5: The method of any one of examples 1 to 4, wherein communicating the Random Access Preamble message to the multiple user equipments in the UECS comprises the coordinating user equipment:
  determining a timing for joint-transmission of the Random Access Preamble message to the base station; and
  communicating the timing for joint-transmission of the Random Access Preamble message to the multiple user equipments in the UECS.

Example 6: The method of any one of examples 1 to 5, wherein communicating the Random Access Preamble message to the multiple user equipments in the UECS comprises the coordinating user equipment:
  determining a first transmit power for joint-transmission of the Random Access Preamble message to the base station; and
  communicating the first transmit power for joint-transmission of the Random Access Preamble message to the multiple user equipments in the UECS.

Example 7: The method of any one of examples 1 to 6, comprising the coordinating user equipment:
  receiving, from the base station, a group RACH Radio Network Temporary Identity, RNTI, for the second user equipment; and
  jointly receiving a Random Access Response of the random access procedure including the group RACH RNTI.

Example 8: The method of example 7, comprising the coordinating user equipment:
  based on receiving the Random Access Response, determining that the random access procedure was successful.

Example 9: The method of any one of examples 1 to 7, comprising the coordinating user equipment:
  based on transmitting the Random Access Preamble message, setting a backoff timer; and
  responsive to the backoff timer expiring before receiving a Random Access Response, directing the multiple user equipments in the UECS to retransmit the Random Access Preamble message.

Example 10: The method of example 9, wherein setting the backoff timer comprises:
  setting the backoff timer to a first time value that is longer than a second time value that would be set by an individual UE performing the random access procedure.

Example 11: The method of example 9 or example 10, further comprising the coordinating user equipment:
  determining a second transmit power for joint-transmission for retransmitting the Random Access Preamble message.

Example 12: The method of any one of examples 1 to 6, wherein the random access procedure is a contention-based random access procedure, the method comprising the coordinating user equipment:
- determining a timing advance for joint-transmission of a Radio Resource Control, RRC, Connection Request message;
- communicating the timing advance to the multiple user equipments in the UECS;
- communicating the RRC Connection Request message to the multiple user equipments in the UECS directing the multiple user equipments to transmit the RRC Connection Request message; and
- transmitting the RRC Connection Request message, to the base station, using the time-frequency resources indicated in the RACH resource group configuration.

Example 13: A method for accessing a wireless communications network using a random access procedure, by a second user equipment, UE, in a user equipment-coordination set, UECS, the method comprising the second user equipment:
- receiving, from a base station, a Random Access Channel, RACH, resource group configuration for random access procedure communications;
- transmitting, to a first UE acting as a coordinating UE in the UECS, a request to initiate the random access procedure;
- receiving, from the first UE, a Random Access Preamble message using a preamble sequence included in the RACH resource group configuration; and
- transmitting the Random Access Preamble message to the base station using a first set of time-frequency resources indicated in the RACH resource group configuration.

Example 14: A user equipment comprising:
- a wireless transceiver;
- a local wireless network transceiver;
- a processor; and
- instructions for a communication manager application that are executable by the processor to configure the user equipment to perform the method of any one of examples 1 to 13.

Example 15: A method of providing access to a wireless communications network using a random access procedure by a base station in an active coordination set, ACS, the method comprising the base station:
- coordinating with other base stations in the ACS to allocate a random access resource set for a user equipment to perform the random access procedure with the ACS;
- transmitting configuration information for the random access resource set to the user equipment;
- coordinating with other base stations in the ACS to jointly receive a Radio Resource Control Connection Request from the user equipment;
- coordinating joint-transmission of a Random Access Response of the random access procedure with one or more of the other base stations in the ACS; and
- transmitting the Random Access Response to enable the user equipment to access the wireless communication network.

Example 16: The method of example 15, wherein coordinating with other base stations in the ACS to jointly receive the Radio Resource Control Connection Request comprises:
- receiving a Random Access Preamble from the user equipment;
- receiving samples of the Random Access Preamble from one or more of the other base stations in the ACS; and
- jointly processing the received Random Access Preamble and the received samples.

Example 17: The method of example 15 or example 16, wherein the configuration information for random access resource set comprises preamble sequences that are specific to the ACS and time-frequency resources for Random Access Channel, RACH, communications with the ACS.

Example 18: The method of any one of examples 15 to 17, wherein the random access resource set is specific to the ACS.

Example 19: The method of any one of examples 15 to 18, wherein the ACS jointly transmits the configuration information for the random access resource set to the user equipment in a broadcast message, a Radio Resource Control, RRC, message, or a Non-Access Stratum, NAS, message.

Example 20: The method of any one of examples 15 to 19, further comprising:
- coordinating with other base stations in the ACS to jointly transmit an Acknowledgement, ACK, and Contention Resolution Identifier, CRID, to the user equipment.

Example 21: The method of any one of examples 15 to 20, further comprising the base station:
- assigning an ACS-specific identity, ACS RNTI, to the user equipment.

Example 22: The method of example 21, wherein the random access procedure is a contention-free random access procedure; and wherein one or more base stations in the ACS communicate with the user equipment using the ACS RNTI of the user equipment.

Example 23: The method of any one of examples 15 to 22, comprising the base station:
- determining a timing advance for joint transmission to the user equipment.

Example 24: A base station comprising:
- a wireless transceiver;
- an inter-base station interface
- a processor; and
- instructions for a base station manager application that are executable by the processor to configure the base station to perform any one of examples 15 to 23.

Example 25 A computer-readable medium comprising instructions which, when executed by a processor, cause an apparatus comprising the processor to perform the method of any one of examples 1 to 13 or 15 to 23.

Although aspects of joint-processing of random access channel communications have been described in language specific to features and/or methods, the subject of the appended claims is not necessarily limited to the specific features or methods described. Rather, the specific features and methods are disclosed as example implementations of joint-processing of random access channel communications, and other equivalent features and methods are intended to be within the scope of the appended claims. Further, various different aspects are described, and it is to be appreciated that each described aspect can be implemented independently or in connection with one or more other described aspects.

The invention claimed is:
1. A method for accessing a wireless communications network using a random access procedure, by a first user equipment (UE) configured as a coordinating user equipment for a user equipment-coordination set (UECS) the method comprising the coordinating user equipment:

receiving, from a base station, a Random Access Channel (RACH) resource group configuration for random access procedure communications;

receiving, from a second user equipment in the UECS, a request to initiate the random access procedure;

generating a Random Access Preamble message using a preamble sequence included in the RACH resource group configuration;

communicating the Random Access Preamble message to multiple user equipments in the UECS that directs the multiple user equipments to transmit the Random Access Preamble message using a first set of time-frequency resources indicated in the RACH resource group configuration; and transmitting the Random Access Preamble message to the base station using the first set of time-frequency resources.

2. The method of claim 1, wherein receiving the RACH resource group configuration comprises:

receiving the RACH resource group configuration in a System Information Block (SIB) from the base station.

3. The method of claim 1, wherein the RACH resource group configuration includes multiple preamble sequences, and wherein generating the Random Access Preamble message comprises:

selecting the preamble sequence, from the multiple preamble sequences, for inclusion in the Random Access Preamble message.

4. The method of claim 1, wherein the RACH resource group configuration includes multiple RACH time-frequency resources, and wherein generating a Random Access Preamble message comprises the coordinating user equipment:

selecting the time-frequency resources from the multiple RACH time-frequency resources.

5. The method of claim 1, wherein communicating the Random Access Preamble message to the multiple user equipments in the UECS comprises the coordinating user equipment:

determining a timing for joint-transmission of the Random Access Preamble message to the base station; and communicating the timing for joint-transmission of the Random Access Preamble message to the multiple user equipments in the UECS.

6. The method of claim 1, wherein communicating the Random Access Preamble message to the multiple user equipments in the UECS comprises the coordinating user equipment:

determining a first transmit power for joint-transmission of the Random Access Preamble message to the base station; and communicating the first transmit power for joint-transmission of the Random Access Preamble message to the multiple user equipments in the UECS.

7. The method of claim 1, comprising the coordinating user equipment:

receiving, from the base station, a group RACH Radio Network Temporary Identity (RNTI) for the second user equipment; and jointly receiving a Random Access Response of the random access procedure including the group RACH RNTI.

8. The method of claim 1, comprising the coordinating user equipment:

based on transmitting the Random Access Preamble message, setting a backoff timer; and responsive to the backoff timer expiring before receiving a Random Access Response, directing the multiple user equipments in the UECS to retransmit the Random Access Preamble message.

9. The method of claim 8, wherein setting the backoff timer comprises:

setting the backoff timer to a first time value that is longer than a second time value that would be set by an individual UE performing the random access procedure.

10. The method of claim 8, further comprising the coordinating user equipment:

determining a second transmit power for joint-transmission for retransmitting the Random Access Preamble message.

11. The method of claim 1, wherein the random access procedure is a contention-based random access procedure, the method comprising the coordinating user equipment:

determining a timing advance for joint-transmission of a Radio Resource Control (RRC) Connection Request message;

communicating the timing advance to the multiple user equipments in the UECS;

communicating the RRC Connection Request message to the multiple user equipments in the UECS directing the multiple user equipments to transmit the RRC Connection Request message; and transmitting the RRC Connection Request message, to the base station, using the time-frequency resources indicated in the RACH resource group configuration.

12. A user equipment comprising:

a wireless transceiver;

a local wireless network transceiver;

a processor; and instructions for a communication manager application that are executable by the processor to configure the user equipment to:

receive, from a base station, a Random Access Channel (RACH) resource group configuration for random access procedure communications;

receive, from another user equipment in a user equipment-coordination set (UECS), a request to initiate the random access procedure;

generate a Random Access Preamble message using a preamble sequence included in the RACH resource group configuration;

communicate the Random Access Preamble message to multiple user equipments in the UECS that directs the multiple user equipments to transmit the Random Access Preamble message using a first set of time-frequency resources indicated in the RACH resource group configuration; and transmit the Random Access Preamble message to the base station using the first set of time-frequency resources.

13. The user equipment of claim 12, wherein the instruction to receive the RACH resource group configuration configure the user equipment to:

receive the RACH resource group configuration in a System Information Block (SIB) from the base station.

14. The user equipment of claim 12, wherein the RACH resource group configuration includes multiple preamble sequences, and wherein the instructions to generate the Random Access Preamble message configure the user equipment to:

select the preamble sequence, from the multiple preamble sequences, for inclusion in the Random Access Preamble message.

15. The user equipment of claim 12, wherein the RACH resource group configuration includes multiple RACH time-frequency resources, and wherein the instructions to generate a Random Access Preamble message configure the user equipment to:
    select the time-frequency resources from the multiple RACH time-frequency resources.

16. The user equipment of claim 12, wherein the instructions to communicate the Random Access Preamble message to the multiple user equipments in the UECS configure the user equipment to:
    determine a timing for joint-transmission of the Random Access Preamble message to the base station; and
    communicate the timing for joint-transmission of the Random Access Preamble message to the multiple user equipments in the UECS.

17. The user equipment of claim 12, wherein the instructions to communicate the Random Access Preamble message to the multiple user equipments in the UECS configure the user equipment to:
    determine a first transmit power for joint-transmission of the Random Access Preamble message to the base station; and
    communicate the first transmit power for joint-transmission of the Random Access Preamble message to the multiple user equipments in the UECS.

18. The user equipment of claim 12, the instructions further executable to configure the user equipment to:
    receive, from the base station, a group RACH Radio Network Temporary Identity (RNTI) for the other user equipment; and
    jointly receive a Random Access Response of the random access procedure including the group RACH RNTI.

19. The user equipment of claim 12, the instructions further executable to configure the user equipment to:
    based on the transmission of the Random Access Preamble message, set a backoff timer; and
    responsive to the backoff timer expiring before receiving a Random Access Response, direct the multiple user equipments in the UECS to retransmit the Random Access Preamble message.

20. The user equipment of claim 19, wherein the instructions to set the backoff timer configure the user equipment to:
    set the backoff timer to a first time value that is longer than a second time value that would be set by an individual UE performing the random access procedure.

* * * * *